Patented June 3, 1941

2,244,174

UNITED STATES PATENT OFFICE 2,244,174

MANUFACTURE OF N,N-DICYCLOHEXYL-PARAPHENYLENE DIAMINE

Paul M. Ruedrich, Berkeley, and Leslie H. Sharp, Martinez, Calif., assignors to Tide Water Associated Oil Company, San Francisco, Calif., a corporation of Delaware No Drawing. Original application December 7, 1938, Serial No. 244,423. Divided and this application October 9, 1939, Serial No. 298,714

7 Claims. (Cl. 260—576)

This invention relates to gasolines which normally tend to form gum in storage, and has for its principal object a method whereby the formation of the gum is greatly retarded.

Another object is to provide a material for blending with such gasolines whereby the formation of gum is practically eliminated during normal periods of storage.

Another object is to provide a gum inhibitor which may be readily and economically prepared.

It is well known that certain gasolines, particularly those manufactured by pyrolitic processes, such as cracking and polymerization, have a tendency to form during storage heavy polymerization products commonly known to the art as "gum." When present in a gasoline this gum tends to form resin-like deposits in the carburetor and intake manifold and on the valve stems of internal combustion engines during use.

The constituents of the gasoline which cause the gum formation are not entirely known. However, it is known that they may be removed by severe treatment of the gasoline with chemicals such as sulphuric acid. Such treatment results in the loss of valuable antiknock constituents of the gasoline and is generally avoided as much as possible.

Recently various materials have been proposed which, when blended with gasoline in small amounts, retard the reaction of the gum-forming constituents and thus prevent, to a greater or less extent depending on the material used, the formation of the gum and thus allow satisfactory operation of the fuel in engines. These materials generally are aromatic organic compounds containing one or more hydroxyl groups. The materials are known to the art as "inhibitors" or "gum inhibitors."

To be satisfactory as an inhibitor a material should, first, be capable of retarding the formation of gum when blended with the gasoline in small amounts of the order of .001% and second, should be practically water insoluble to prevent its being extracted from the gasoline by any water with which the gasoline may come in contact during storage. At least the material should be much more soluble in the gasoline than in water.

According to the present invention a material has been found which is particularly suited for use as an inhibitor as hereinafter more fully set forth.

When dicyclohexylamine is heated with paraaminophenol at a temperature of 300° F. the following reaction is initiated:

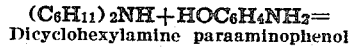
Dicyclohexylamine paraaminophenol

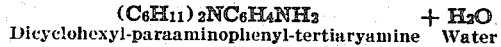
Dicyclohexyl-paraaminophenyl-tertiaryamine   Water

By conducting the reaction in a vessel provided with a partial reflux condenser, preferably with a slight excess (say 10%) of the dicyclohexylamine over the stoichiometrical requirements, the water of reaction is gradually eliminated causing the reaction to go to completion. For complete reaction two or three days may be required. Higher temperatures are to be avoided as the paraaminophenol decomposes at about 360° F., while at lower temperatures the elimination of the water is slower.

An alternate method of producing the reaction is to heat the materials in an autoclave in the presence of a mild dehydrating agent. The proper conditions of time and temperature and the choice of dehydrating agent can readily be determined by a skilled organic chemist.

Upon washing the products of the reaction with petroleum ether followed by aqueous ammonium hydroxide, the dicyclohexyl-paraaminophenyl-tertiary amine is recovered in substantially pure form. Another chemical name for the same material is "NN-dicyclohexyl-p-phenylene diamine." For the purposes of brevity this product will be referred to subsequently in these specifications by the term "D. C. H. A."

The product D. C. H. A. produced by the above reaction has been found to successfully function as a gum inhibitor when blended with gasolines in the proportions of from 0.0001% up to its limit of solubility in gasoline, but particularly in the preferred proportions of from 0.001% to 0.01% by weight. Its solubility in straight run gasoline is 0.07% by weight, while in cracked gasoline it is soluble up to about 0.1% by weight depending on the type of cracked gasolines. Its solubility in water is 0.0002% by weight which is considerably lower than the water solubility of a number of inhibitors in general use.

The D. C. H. A., being soluble in gasoline may be added directly to the gasoline to be treated, with proper agitation. It is more convenient, however, to dissolve the material in a suitable solvent, for which purpose acetone or one of the higher alcohols (propyl alcohol, butyl alcohol, etc.) have been found satisfactory. The desired amount of the solution may then be readily blended with gasoline.

The following examples are illustrative of the gum-inhibiting ability of the D. C. H. A.

EXAMPLE 1

Three portions of a blend of 25% straight run gasoline, 65% cracked gasoline, and 10% polymer gasoline were blended with various amounts of the D. C. H. A. and then tested for gum stability in comparison with a fourth portion of the blend containing no inhibitor. The gum stability test used was that described in an article entitled "Inhibitors in cracked gasoline" published in Industrial and Engineering Chemistry volume 24 (1932) pages 1375 to 1382. The method consists briefly in sealing a sample of the gasoline in a steel bomb under 100 pounds gage pressure of oxygen and heating for several hours at a temperature of 212° F. The length of time of heating until there is a sharp reduction in the oxygen pressure (due to oxidation reactions in the gasoline) is called the "induction period" and is generally recognized in the art to be indicative of the gum stability of the gasoline under test.

After treatment in the bomb the gum content of the four portions was determined by (1) the American Society for Testing Materials Method D 381–36 and (2) test method No. 530.1 of the U. S. Bureau of Mines Technical Paper 323B, commonly known as the "copper dish" method.

The results of the tests are shown in Table 1.

Table 1

| Inhibitor used | Amount | Induction period | Mg. gum per 100 cc. gasoline after 300 minutes oxidation | |
|---|---|---|---|---|
| | | | A. S. T. M. | Copper dish |
| | Percent by weight | Minutes | | |
| D. C. H. A. | None | 75 | 338 | 1,012 |
| D. C. H. A. | .0016 | 240 | 208 | 776 |
| D. C. H. A. | .0031 | +300 | 6 | 29 |
| D. C. H. A. | .0047 | +300 | 6 | 22 |

EXAMPLE 2

Three portions of a gasoline blend similar to that used in Example 1 were treated with various amounts of D. C. H. A. and compared by the oxygen bomb test with a fourth portion of the blend containing no inhibitor. The results of these tests are shown in Table 2.

Table 2

| Inhibitor used | Amount | Induction period | Mg. gum per 100 cc. gasoline after 350 minutes oxidation | |
|---|---|---|---|---|
| | | | A. S. T. M. | Copper dish |
| | Percent by weight | Minutes | | |
| D. C. H. A. | None | 100 | 438 | 1,025 |
| D. C. H. A. | 0.0025 | 195 | 292 | 864 |
| D. C. H. A. | 0.0038 | 270 | 112 | 667 |
| D. C. H. A. | 0.0050 | 345 | 53 | 228 |

EXAMPLE 3

Two portions of a gasoline blend similar to that used in Example 1 were treated with D. C. H. A. and compared by the oxygen bomb test with two portions of the same gasoline treated with monobenzyl-para-aminophenol. The latter is a well known and much used inhibitor and is known to the art as B. A. P. The results of these tests are shown in Table 3.

Table 3

| Inhibitor used | Amount | Induction period | Mg. gum per 100 cc. gasoline after 250 minutes oxidation | |
|---|---|---|---|---|
| | | | A. S. T. M. | Copper dish |
| | Percent by weight | Minutes | | |
| B. A. P. | .0025 | 195 | 179 | 747 |
| B. A. P. | .0036 | 240 | 97 | 452 |
| D. C. H. A. | .0024 | 195 | 161 | 622 |
| D. C. H. A. | .0034 | +250 | 17 | 70 |

From the above description and examples it may be readily seen that the D. C. H. A. is an effective inhibitor for the retarding of gum formation in gasolines in addition to having the desired low solubility in water. Furthermore, the inhibitor may be readily prepared from relatively inexpensive materials.

In the above description the term "gasoline" has been used to describe a hydrocarbon motor fuel suitable for use in the carbureted type of internal combustion engines and is not to be limited to any particular boiling point specifications. The invention further contemplates the use of the inhibitor in various naphthas, such as cleaners solvent, whether intended for consumption in an internal combustion engine or not.

This application is a division of our copending application Serial Number 244,423, filed December 7, 1938, which matured into U. S. Patent 2,207,163 dated July 9, 1940.

We claim:

1. In a process of manufacturing dicyclohexyl-paraaminophenyl-tertiary amine the step which comprises: heating dicyclohexylamine with para-aminophenol at a temperature of about 300° F.

2. In a process of manufacturing dicyclohexyl-paraaminophenyl-tertiary amine the step which comprises: heating dicyclohexylamine with para-aminophenol at a temperature between the boiling point of water and the decomposition temperature of paraaminophenol.

3. The step according to claim 2 in which the heating is conducted under dehydrating conditions.

4. The step according to claim 2 in which the heating is conducted under partial reflux conditions for a time sufficient to remove the resulting water of reaction by evaporation.

5. The process of manufacturing dicyclohexyl-paraaminophenyl-tertiary amine which comprises: reacting dicyclohexylamine and paraaminophenol at a temperature of about 300° F. under conditions sufficient to remove the resulting water of reaction, washing the remaining products with petroleum ether and removing said ether, and washing the remaining products with aqueous ammonium hydroxide and removing said aqueous ammonium hydroxide.

6. The process of manufacturing dicyclohexyl-paraaminophenyl-tertiary amine which comprises: reacting dicyclohexylamine and paraaminophenol at a temperature between the boiling point of water and the decomposition temperature of paraaminophenol, removing the resulting water of reaction, washing the remaining products with petroleum ether and removing said ether, and washing the remaining products with aqueous ammonium hydroxide and removing said aqueous ammonium hydroxide.

7. The process of manufacturing dicyclohexyl-paraaminophenyl-tertiary amine which comprises: reacting dicyclohexylamine and paraaminophenol at a temperature between the boiling point of water and the decomposition temperature of paraaminophenol and simultaneously removing the resulting water of reaction.

PAUL M. RUEDRICH.
LESLIE H. SHARP.